(12) United States Patent
Woods, Jr.

(10) Patent No.: US 9,395,145 B2
(45) Date of Patent: Jul. 19, 2016

(54) AUTOMATIC LINE RELEASE MECHANISM FOR A BOW

(71) Applicant: Lemuel Jackson Woods, Jr., Evans, GA (US)

(72) Inventor: Lemuel Jackson Woods, Jr., Evans, GA (US)

(*) Notice: Subject to any disclaimer, the term of this patent is extended or adjusted under 35 U.S.C. 154(b) by 0 days.

(21) Appl. No.: 14/296,775

(22) Filed: Jun. 5, 2014

(65) Prior Publication Data

US 2015/0354915 A1 Dec. 10, 2015

(51) Int. Cl.
*F41B 5/14* (2006.01)
*A01K 91/02* (2006.01)
*A01K 81/00* (2006.01)
*A01K 89/00* (2006.01)

(52) U.S. Cl.
CPC ............... *F41B 5/1488* (2013.01); *A01K 81/00* (2013.01); *A01K 89/00* (2013.01); *A01K 91/02* (2013.01)

(58) Field of Classification Search
CPC ...... F41B 5/1488; A01K 91/02; A01K 81/00; A01K 89/00
USPC .................. 124/23.1, 86, 88; 43/19
See application file for complete search history.

(56) References Cited

U.S. PATENT DOCUMENTS

| | | | | |
|---|---|---|---|---|
| 736,051 A * | 8/1903 | Adams | F41B 5/14 | 124/24.1 |
| 2,918,049 A * | 12/1959 | Stockfleth | F41B 5/1488 | 124/23.1 |
| 3,377,999 A * | 4/1968 | Bennett | F41B 5/1488 | 124/23.1 |
| 3,949,730 A * | 4/1976 | Schoenberger | F41B 5/1488 | 124/23.1 |
| 4,024,667 A * | 5/1977 | Wegener | F41B 5/1488 | 124/23.1 |
| 4,110,929 A * | 9/1978 | Weigand | A01K 91/02 | 124/57 |
| 4,383,516 A * | 5/1983 | La See | F41B 5/1488 | 124/80 |
| 4,674,471 A * | 6/1987 | Lance | A01K 81/00 | 124/86 |
| 4,726,348 A * | 2/1988 | Saunders | F42B 12/68 | 124/23.1 |
| 4,773,179 A * | 9/1988 | Corley | A01K 91/02 | 124/86 |
| 5,143,044 A * | 9/1992 | Bourquin | F41B 5/1488 | 124/86 |
| 5,443,218 A * | 8/1995 | Ciocca | A01K 89/01 | 242/256 |
| 6,056,220 A * | 5/2000 | Cockerham | A01K 89/01 | 242/232 |
| 6,517,453 B2 * | 2/2003 | LaSee | F42B 12/68 | 124/86 |
| 6,634,350 B2 * | 10/2003 | LaSee | A01K 81/00 | 124/86 |
| 6,796,522 B2 * | 9/2004 | Braun | A62B 1/06 | 226/177 |
| 7,178,751 B1 * | 2/2007 | Isaacs | A01K 89/015 | 242/231 |
| 8,434,466 B2 * | 5/2013 | Woods, Jr. | A41B 5/14 | 124/86 |
| 8,464,700 B2 * | 6/2013 | Smith | F41G 1/467 | 124/87 |
| 9,043,999 B1 * | 6/2015 | Boester | A01K 89/02 | |
| 9,101,119 B2 * | 8/2015 | Dunlop | A01K 89/0108 | |
| 2003/0136870 A1 * | 7/2003 | Braun | A62B 1/06 | 242/360 |
| 2003/0140912 A1 * | 7/2003 | LaSee | A01K 81/00 | 124/86 |
| 2005/0087180 A1 * | 4/2005 | Hayes | F41B 7/04 | 124/1 |
| 2009/0038600 A1 * | 2/2009 | Robinik | F41B 7/04 | 124/22 |
| 2011/0005120 A1 * | 1/2011 | de Koning | A01K 87/00 | 43/19 |
| 2011/0240811 A1 * | 10/2011 | Soderberg | A01K 91/02 | 248/222.14 |
| 2012/0042863 A1 * | 2/2012 | Smith | F41G 1/467 | 124/87 |
| 2012/0285430 A1 * | 11/2012 | Dunlop | A01K 89/0108 | 124/23.1 |
| 2015/0053195 A1 * | 2/2015 | Soderberg | A01K 91/02 | 124/88 |
| 2015/0264907 A1 * | 9/2015 | Dunlop | A01K 89/0108 | 124/23.1 |
| 2015/0354915 A1 * | 12/2015 | Woods, Jr. | F41B 5/1488 | 124/86 |

* cited by examiner

*Primary Examiner* — Alexander Niconovich
(74) *Attorney, Agent, or Firm* — J. Bennett Mullinax, LLC

(57) ABSTRACT

An automatic line release mechanism for a bow is provided that includes an actuator that moves relative to a riser of the bow when a string of the bow is drawn. When the string of the bow is drawn the actuator actuates a push button of a reel to cause line of the reel to be released.

19 Claims, 5 Drawing Sheets

AUTOMATIC LINE RELEASE MECHANISM FOR A BOW

FIELD OF THE INVENTION

The present invention relates generally to a line release mechanism for use with a bow that has a line attached to an arrow. More particularly, the present application relates to a line release mechanism for use in bowfishing that automatically actuates a pushbutton of a closed face reel upon drawing back the string of the bow.

BACKGROUND

Bowfishing is a method of fishing that involves using a bow and arrow to strike fish and subsequently reel them back towards the archer. A bow that may be used in bowfishing typically has a reel mounted to the bow from which line is dispensed. The line is attached to the arrow, and upon firing the arrow the line from the reel is withdrawn. Once the arrow is fired, it may be subsequently retrieved by the archer through use of the reel. The archer can wind a handle on the reel to reel in the line and attached arrow. If the shot was a hit, the archer can hold onto the handle of the bow with one hand, and crank the reel with his or her other hand to fight the fish and draw the fish back to the archer.

The reel used in bowfishing in an at rest position before firing of the bow is generally locked. In this regard, the line cannot be removed from the bow. This configuration is advantageous because the archer when walking around or otherwise holding the bow without firing need not worry about having the line fall off of the reel. Once the archer desires to fire the reel, he or she will actuate a push button of the reel. This actuation unlocks the reel to allow the line to be freely dispensed from the reel. The archer will then, after pressing this button, nook and arrow and draw the string of the bow. The archer will take aim and fire the arrow. The arrow and attached string will fly through the air to either hit or miss their target as discussed. Turning of a handle on the reel will once again lock the line so that it can no longer be freely dispensed, and the line will be drawn back into the reel upon turning of the handle.

The archer may forget to actuate the push button of the reel before firing the arrow. This situation is problematic because if the archer fires the arrow without releasing the line the force of the arrow on the line may cause gears or other structure of the reel to be broken. The archer may thus damage their bow if they forget to press the push button. Further, the archer may be injured through the breaking of components or forces on the arrow if the line is not unlocked prior to shooting the bow.

Also, the act of pressing the push button and then drawing the bow is time consuming. The few seconds needed to perform this task may allow the archer's target to escape or otherwise move out of optimal range thus decreasing the archer's chance of successfully striking their target. Also, once the line is released upon pressing the push button, it may fall freely off of the reel before firing of the arrow. This could be problematic in that movement of the bow by the archer after hitting the push button, but before firing of the bow, may cause fallen line to get in the way of the shot or even wrap around something thus potentially injuring the archer upon firing the arrow that is attached to the line. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
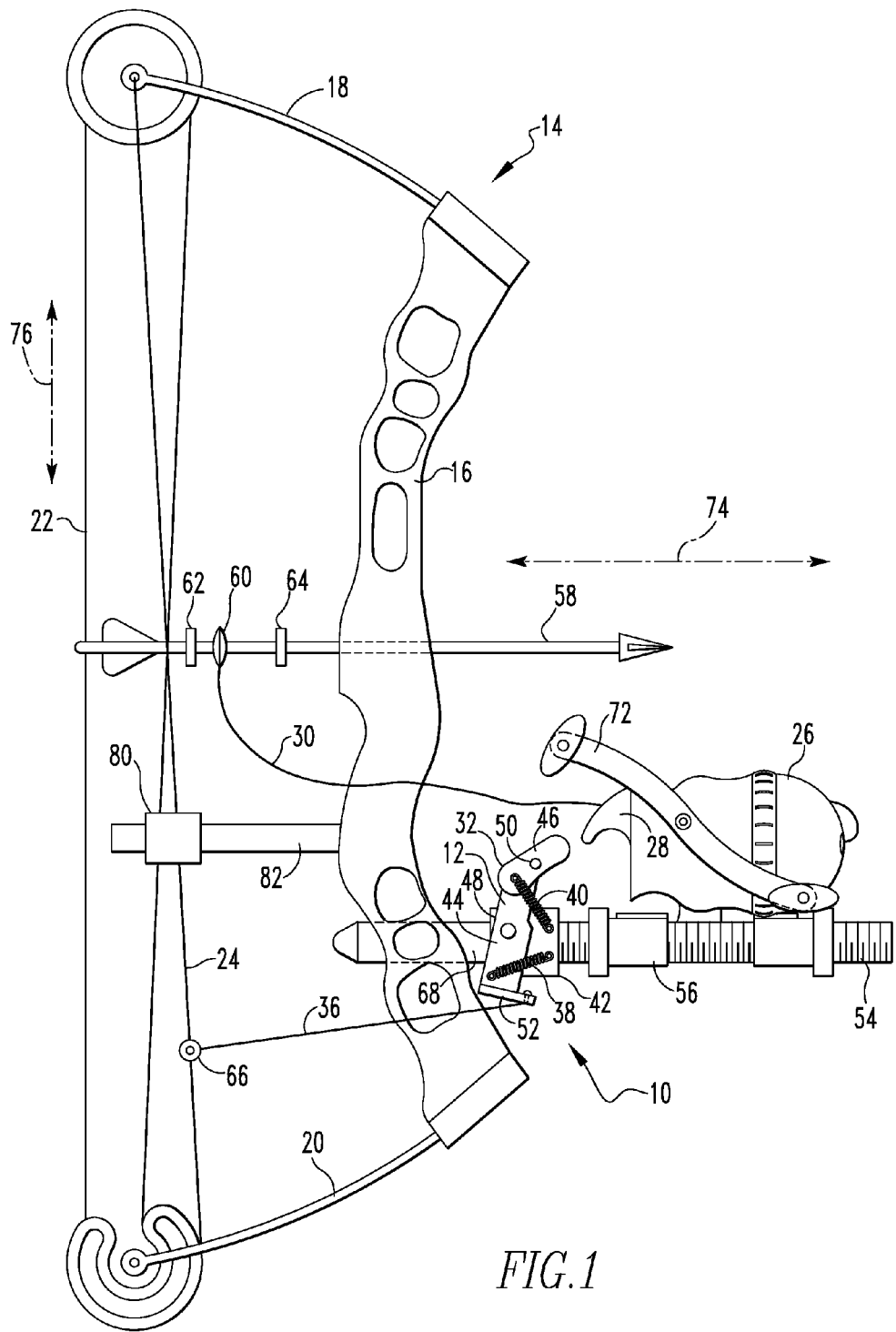
FIG. 1 is a side view of a bow that has an automatic line release mechanism in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an automatic line release mechanism 10 for a bow 14 that is used with a reel 26 for automatically releasing the line 30 of the reel 26. The mechanism 10 may be used for bows 14 that are employed in bowfishing, but could be used in conjunction with bows 14 that are not used in bowfishing. The mechanism 10 may include an actuator 12 that pivots when the archer draws the bow 14 through engagement of the actuator 12 with actuator line 36 attached to a string 22 or cable 24 of the bow 14. This pivoting causes the actuator 12 to come into contact with a push button 28 of a reel 26 that is mounted to the bow 14. Actuation of the push button 28 causes the line 30 of the reel 26 to be released. The archer then releases the string 22 to fire the arrow 58. This causes the force of the actuator line 36 to be released on the actuator 12, and a spring 38 can be employed to cause the actuator 12 to move back into its original position. The automatic line release allows the archer to shoot the arrow 58 without having to worry about actuating the push button 28 to release the line 30. The actuator 12 can be arranged so that it moves back into it's at rest position automatically without the user having to manually reset it in certain arrangements.

An exemplary embodiment of the automatic line release mechanism 10 is shown in FIG. 1 attached to a bow 14. The bow 14 that is illustrated is a compound bow that has a pair of cams rotatably mounted to an upper limb 18 and a lower limb 20 of the bow. Cable 24 is configured with the cams and cause a desired reduction in draw power from the archer to enhance ease of use of the bow 14. The string 22 is grasped by the archer and drawn and released in order to fire the arrow 58. The cable 24 moves when the string 22 is drawn by the archer. Although a compound bow 14 is shown for use with the automatic line release mechanism 10, it is to be understood that other types of bows 14 can be used in connection with the mechanism 10, and the bow 14 in other embodiments need not be a compound bow.

The bow 14 may be used for bowfishing and includes a reel 26 that has line 30 attached to the arrow 58. The arrow 58 has a pair of stops 62, 64 between which a sliding member 60 can slide. The line 30 is attached to the sliding member 60, and when the arrow 58 is fired the line 30 is removed from the reel 26. Should the arrow 58 impel a fish, or simply miss, the user can pull in the fish or retrieve the arrow 58 by turning the handle 72 the functions to reel in the line 30. The reel 26 may be a closed face reel in accordance with certain exemplary embodiments. However, other variations exist in which the reel 26 is not a closed face reel, but may instead be an open faced spinning reel or a bait casting reel.

The reel 26 may be mounted to a riser 16 of the bow 14 through the use of a reel seat 54. The riser 16 of the bow 14 includes a handle that is grasped by the user when firing the bow 14. The reel 26 has one or two mounting arms that are placed along the upper surface of the reel seat 54 such that one is forward of the other in a longitudinal direction 74 of the bow 14. The reel seat 54 has one or more hoods than can be moved along the length of the reel seat 54 in the longitudinal direction 74 to cover one or both of the mounting arms to effect locking of the mounting arms, and hence reel 26, to the reel seat 54. A length of the reel seat 54 may be provided with external threading that engages complimentary threading of the hoods to allow the hoods to move in relation to the externally threaded portions of the reel seat 54. However, other manners of effecting attachment of the reel 26 to the reel seat 54 may be employed in other arrangements. A mounting location 56 designates the location of where the reel 26 is mounted to the reel seat 54.

The reel seat 54 could be mounted to the riser 16 through direct attachment, or through indirect attachment by being attached to a mounting arm 68 that in turn is directly attached to the riser 16. In this regard, the mounting arm 68 may extend through an aperture in the riser 16 and a threaded connection can be made on the opposite site to cause the mounting arm 68 to be attached to the riser 16. The reel seat 54 may be in turn attached to the mounting arm 68 through a threaded or welded connection. As stated, other arrangements are possible in which the reel seat 54 itself extends all the way to the riser 16 and directly engages the riser 16 to cause attachment of the reel set 54.

The reel 26 includes a push button 28 that functions as a lock release with respect to the line 30 of the reel 26. In FIG. 1, the push button 28 is not actuated and the line 30 is locked onto the reel 26 such that it cannot be dispensed from a barrel of the reel 26. If the push button 28 is pushed forward in the longitudinal direction 74 away from the riser 16, or otherwise pivoted forward in the longitudinal direction 74, the locking of the reel 26 will be released and the line 30 will be freely dispensed from the barrel of the reel 26. Once the user no longer wishes for the line 30 to be dispensed from the reel 26, he or she may begin rotating the handle 72. The mechanical configuration of the reel 26 is set up such that once rotation of the handle 72 begins; the line 30 is once again locked into the barrel and cannot be dispensed although it can be wound back into the barrel upon repeated turning of the handle 72. Also, once the handle 72 is first turned, the push button 28 will normally "pop" backwards or otherwise move backwards in the longitudinal direction 74 to assume the position illustrated in FIG. 1.

The automatic line release mechanism 10 may include a base 42 that is rigidly attached to the mounting arm 68 and does not move relative to the mounting arm 68. The base 42 may be welded onto the mounting arm 68, or otherwise attached through the use of bolts, clips, adhesive, or other mechanical fasteners. Further, the base 42 may have an aperture into which internal threading is present for engagement with the external threading of the reel seat 54. In this regard, the base 42 can engage the reel seat 54 and be attached to the reel seat 54 through the threaded engagement. The base 42 may not move with respect to the reel seat 54 during use of the automatic line release mechanism 10.

The actuator 12 may include an arm 32 that is attached to the base 42 through a pivot engagement 48. The pivot engagement can be a pin or any other type of connection that allows the arm 32 to pivot with respect to the base 42. Although described as pivoting with respect to the base 42, it is to be understood that since the base 42 does not move with respect to the reel seat 54, mounting arm 68, or riser 16 of the bow 14 during use of the bow 14, that the arm 32 may also be described as pivoting with respect to the riser 16, mounting arm 68, or reel seat 54.

The mechanism 10 includes an actuator line 36 that extends from the arm 32 to the cable 24. The arm 36 may have an attachment plate 52 located at its lower terminal end. The attachment plate 52 may have an aperture through which the actuator line 36 extends and is tied off or otherwise secured on the opposite side. The actuator line 36 may be attached to the arm 32 at a location such that the pivot engagement 48 is located between the point of attachment of the actuator line 36 and the point of contact of the arm 32 with the push button 28.

The actuator 12 may include a clamp 66 that engages the cable 24. The clamp 66 engages the cable 24 and moves when the string 22 is drawn back in the longitudinal direction 74. This movement may likewise be in the longitudinal direction 74. The actuator line 36 is attached to the clamp 66 such that when the clamp 66 moves the actuator line 36 likewise moves up or down in the height direction 76. The movement of the clamp 66 could be both in the height direction 76 and the longitudinal direction 74 as the cables 24 may move in both of these directions when the string 22 is drawn. The clamp 66 may be any type of connection that allows the actuator line 36 to be attached to the cable 24. The attachment may be a static attachment in that the attached portion of the actuator line 36 does not move relative to the attached portion of the cable 24 at the clamp 66. Further, although shown as being attached to the cable 24, the clamp 66 and/or actuator line 36 may be attached to the string 22 in other exemplary embodiments.

The bow 14 may include a cable guard 80 that extends rearward from the riser 16 in the longitudinal direction 74. The cable guard 80 functions to hold the cables 24 away from the arrow 58 in the lateral direction 78 so that when the arrow 58 is pulled back and fired it does not contact the cables 24. To prevent friction and wear on the cables 24, the cable guard 80 is provided with a cable slide 82 that engages the cables 24. The cable slide 82 can move in the longitudinal direction 74 and thus moves along the length of the cable guard 80 that is fixed in position with respect to the riser 16. As the cables 24 move upon drawing and releasing the string 22, their position will change in the longitudinal direction 74 causing the cable slide 82 to likewise move in the longitudinal direction 74. The end of the actuator line 36 could be attached to the cable slide 82 in certain arrangements. As the cable slide 82 moves in the longitudinal. direction 74 upon drawing back the string 22, the attached actuator line 36 will likewise move some amount to effect pivoting of the arm 32.

The arrangement of the actuator line 36 with the arm 32 causes force to be applied by the actuator line 36 on the arm 32 when the string 22 is drawn. This force causes the arm 32 to pivot about the pivot engagement 48. The arm 32 will pivot in the clockwise direction in FIG. 1 when the string 22 is drawn. The push button 28 is not actuated in FIG. 1, and the arm 32 is shown in an at rest position in which the string 22 has not been drawn.

The actuator 12 includes a first spring 38 that is attached to the arm 32 and the base 42. The first spring 38 biases the arm 32 in a direction opposite to the pivoting forces applied by the actuator line 36 when the string 22 is drawn. The first spring 38 is present in order to return the arm 32 to the position shown in FIG. 1 after it has been rotated as will be momentarily discussed. The first spring 38 is attached to the arm 32 at a position on an opposite side of the pivot engagement 48 from the point of contact between the arm 32 and the push button 28.

The arm 32 in the exemplary embodiment in FIG. 1 includes a first portion 44 and a second portion 46. The first portion 44 is pivotally engaged with the base 42 through the pivot engagement 48, and the first spring 38 is attached to the first portion 44. The second portion 46 is in pivoting engagement with the first portion 44 through a pivot engagement 50. The pivot engagement 50 may be a pin or other type of connection that allows the second portion 46 to pivot with respect to the first portion 44. The actuator 12 may also include a second spring 40 that is attached to the base 42 and to the second portion 46. The location of attachment of the second spring 40 to the second portion 46 may be on an opposite side of the pivot engagement 50 than the point of engagement between the second portion 46 and the push button 28.

The second spring 40 functions to pull the second portion 46 into the position shown in FIG. 1 with respect to the first portion 44. The second portion 46 engages the first portion 44 and cannot be pivoted any more about the pivot engagement 50 in the counter clockwise direction in FIG. 1. Although the first and second springs 38 and 40 are shown as being connected to the base 42, they may be connected to other portions of the bow 14, such as to the reel seat 54 in accordance with other exemplary embodiments.

Figure 2:
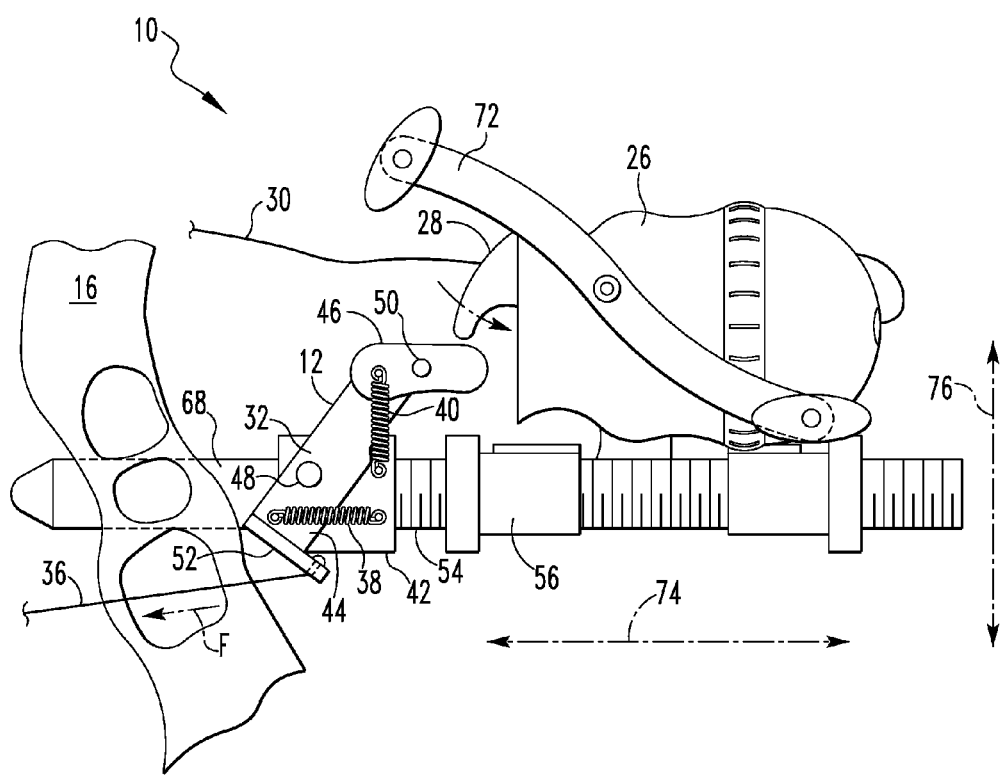
FIG. 2 is a detailed side view of the mechanism of FIG. 1 upon actuation of a push button of a reel.

In use of the bow 14, the archer will grasp the handle of the riser 16 with one hand and the string 22 with the other. The actuator 12 is shown in FIG. 1 as it would be in an at rest position before firing of the arrow 58 or even drawing the string 22 backwards in the longitudinal direction 74. The push button 28 in FIG. 1 is in an unactuated state and the line 30 cannot be unwound or otherwise released from the barrel of the reel 26. FIG. 2 shows a portion of the bow 14 when the archer has drawn the string 22. The string 22 may be drawn to the position right before firing of the arrow 58. This action will cause the clamp 66 and attached actuation line 36 to move some amount in the longitudinal and/or height directions 74, 76. The actuation line 36 will apply force F to the arm 32 to cause the arm 32 to pivot about the pivot engagement 48. Both the first portion 44 and the second portion 46 will pivot about the pivot engagement 48 as a rigid body. The spring force applied by the second spring 40 will cause the second portion 46 to maintain its same position relative to the first portion 44 from the actuator's 12 movement between FIG. 1 and FIG. 2. The actuator 12 moves such that the second portion 46 comes into contact with the push button 28. The second portion 46 engages the push button 28, and continued pivoting of the arm 32 causes the second portion 46 to apply sufficient force to the push button 28 to actuate the push button 28. As such, the archer in drawing the string 22 causes the second portion 46 to actuate the push button 28 to thus automatically release the line 30 in the reel 26 to cause the line 30 to be freely dispensed from the reel 26.

The arm 32 can continue to be pivoted about the pivot engagement 48 such that it clears the push button 28 and moves out of engagement with the push button 28. The push button 28 may be configured so that it rotates, slides, or performs some combination of linear and rotational movement when being actuated. Maximum draw of the string 22 may cause the arm 32 to achieve a maximum rotation as shown in FIG. 2 from its opposite, at rest position shown in FIG. 1. Alternatively, the arm 32 can pivot about the pivot engagement 48 until some portion of the arm 32 engages the reel 26, reel seat 54 or some other portion of the bow 14 and is forced to stop.

The first spring 38 functions to pivot the arm 32 in the opposite direction about the pivot engagement 48 as the force F. However, the force F is strong enough to overcome the first spring 38 biasing force when the string 22 is drawn. As stated, actuation of the push button 28 causes the line 30 to be released. The push button 28 may maintain its same, depressed, position upon actuation, or may move back into its normal, "at rest" position as shown in FIG. 1 immediately after actuation. Once the string 22 is released, the force F is eliminated and the first spring 38 will bias the arm 32 to return it to the position shown in FIG. 1. As such, the first spring 38 will act to turn the arm 32 counter clockwise from the position shown in FIG. 2. It may be the case that the position of the push button 28 will interfere with the return of the arm 32 back to its at rest position of FIG. 1. This is because the arm 32 after actuating the push button 28 is "under" the push button 28 in the height direction 76.

Figure 3:
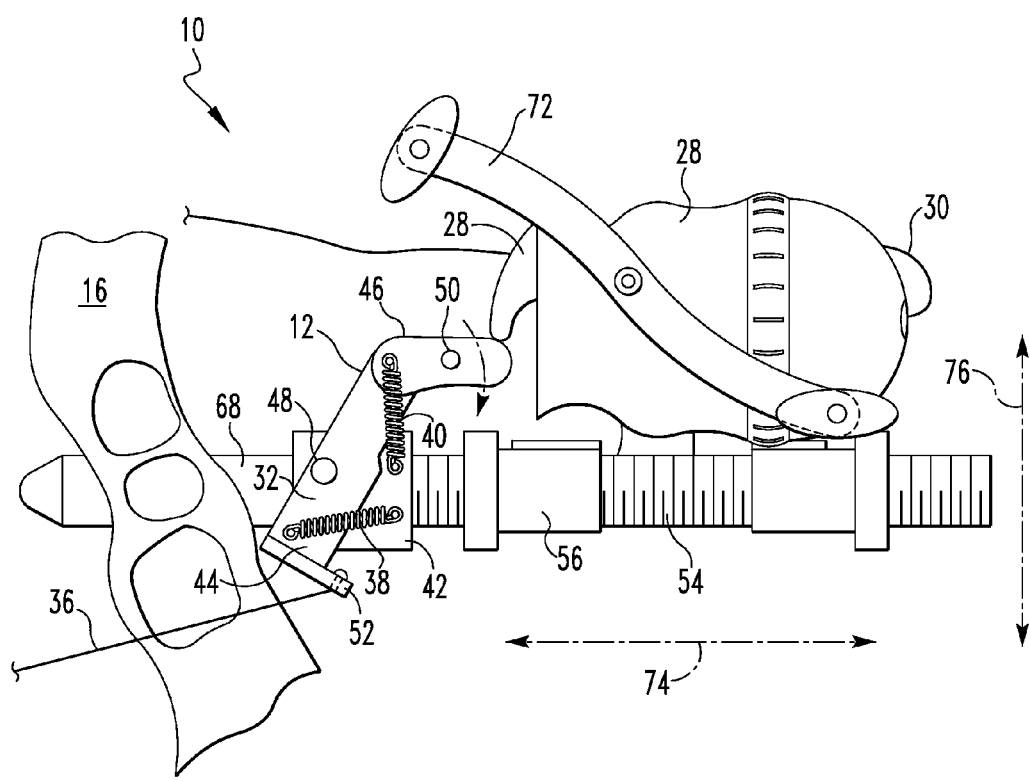
FIG. 3 is a detailed side view of the mechanism of FIG. 1 after actuation of the push button where an actuator of the mechanism engages the push button upon moving back to its at rest position.

With reference to FIG. 3, the arm 32 is provided with the second portion 46 in order to overcome interference with the push button 28. FIG. 3 shows the bow 14 after firing of the arrow 58 and during return of the arm 32 back towards the at rest position shown in FIG. 1. As the force F is removed due to the release of the string 22, the spring force of the first spring 38 is not counteracted and the first spring 38 functions to pivot the arm 32 about the pivot engagement 48 in the counter clockwise direction. The second portion 46 engages the push button 28 as the arm 32 is returned back to the at rest position. The second portion 46 engages the push button 28, and the first spring 38 continues to cause the first portion 44 to pivot. This arrangement in turn causes the second portion 46 to pivot about the pivot engagement 50 with respect to the first portion 44. The spring force of the second spring 40 is overcome by this engagement force and the second portion 46 pivots the necessary amount to allow it to clear the push button 28. As the second portion 46 moves out of engagement with the push button 28, there is no longer any contact force present between the second portion 46 and the push button 28. This removal of contact force thus causes the spring force of the second spring 40 to be unopposed. The second spring 40 will thus cause the second portion 46 to pivot about the pivot engagement 50 with respect to the first portion 44 so that the second portion 46 assumes the "at rest" position with respect to the first portion 44 as illustrated with reference to both FIGS. 1 and 2. The line 30 is being pulled by the fired arrow 58 in FIG. 33 and thus extends forward in the longitudinal direction 74 and is not located at any point rearward of the arm 32 in the longitudinal direction 74.

Once the arrow 58 hits its target or misses its target and comes to rest, the user may pull in the target or otherwise retrieve the arrow 58 upon reeling in the line 30 attached to the arrow 58. The actuator 12 will assume it's at rest position as illustrated in FIG. 1 after moving past the push button 28 as previously described. Once the user turns the handle 72 to reel in the line 30, the push button 28 will generally "pop" back to the at rest position shown in FIG. 1. This pop back, which is pivoting or movement backwards generally in the longitudinal direction 74 or upwards in the height direction 76, will not interfere with the actuator 12 as the actuator 12 has all ready moved back to its at rest position before the handle 72 is turned. Continued rotation of the handle 72 will pull the line 30 into the barrel of the reel 26 and prevent the line 30 from being withdrawn from the reel 26.

Although shown as being out of engagement with the push button 28 in the at rest position of FIG. 1, other exemplary embodiments are possible in which the arm 32 engages the push button 28 in the at rest position. However, although the arm 32 may engage the push button 28, it may not apply sufficient force to the push button 28 to actuate the push button 28.

Figure 4:
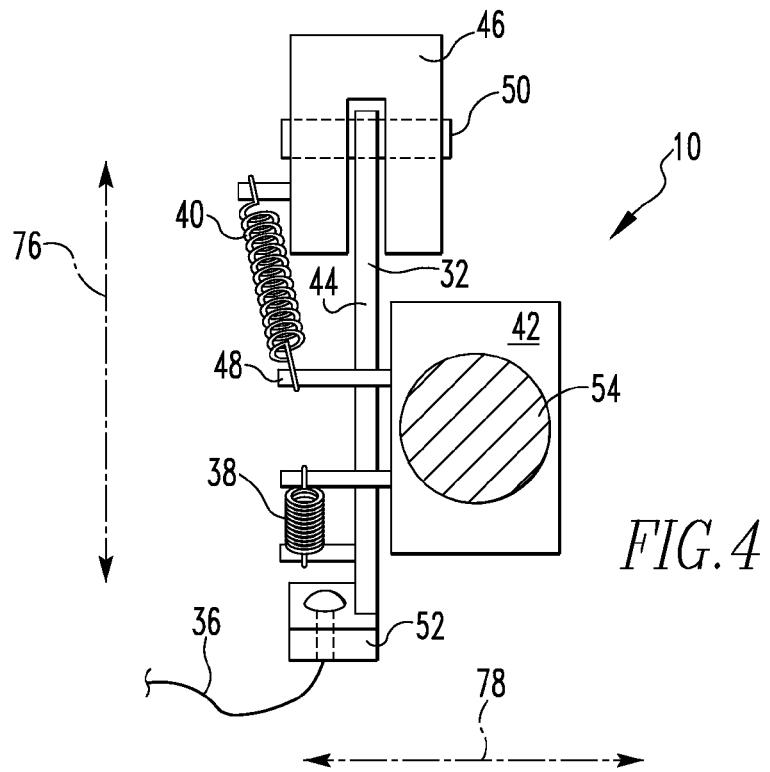
FIG. 4 is a front view of the automatic line release mechanism of FIG. 1.
Figure 5:
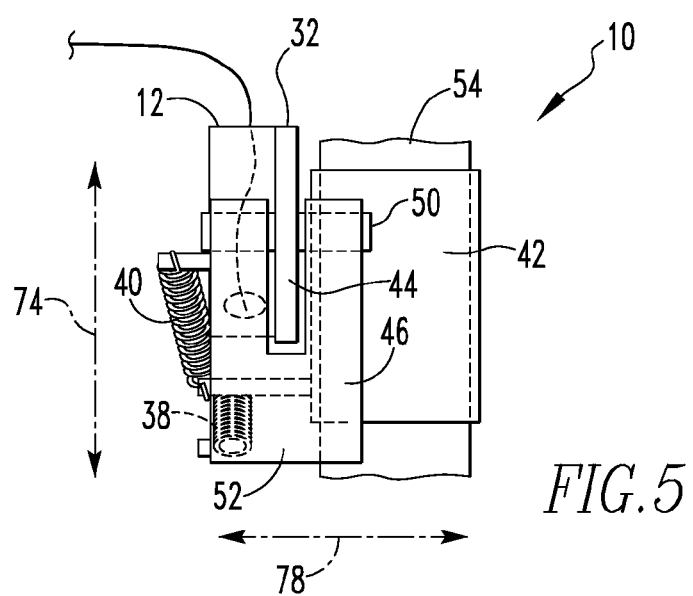
FIG. 5 is a top view of the automatic line release mechanism of FIG. 1.

FIGS. 4 and 5 show a front view and a top view of the actuator 12. The actuator 12 is shown in its "at rest" position that is illustrated in FIG. 1. The second portion 46 is shown as being made up of two plates with a cavity between the two plates into which a section of the first portion 44 can be located during relative movement of the two portions 44, 46. The springs 38, 40 may extend both in the height direction 76 of the bow 14, and in a lateral direction 78 of the bow 14. The first portion 44 is shown as being pivotally mounted to the side of the base 42 in the lateral direction 78. However, it need not be to the side o the base 42 in the lateral direction 78 in other exemplary embodiments. The attachment plate 52 extends outward in the lateral direction 78 so as to be located outboard from the springs 38 and 40 from the base 42 in the lateral direction 78.

An alternative exemplary embodiment of the automatic line release mechanism 10 is illustrated with reference to FIG. 6. The actuator 12 includes an arm 32 that does not have a second portion 46 that rotates relative to a first portion 44. Instead, the arm 32 has a generally solid, rigid construction on both sides of the pivot engagement 48 such that no portion on one side pivots relative to a potion on the opposite side. A spring 38 is connected to the arm 32 and is located generally at the bottom of the arm 32 in the height direction 76. The spring 38 is attached to the reel seat 54, although it may be attached to the base 42 in other exemplary embodiments. The spring 38 performs the same function as described previously with respect to the spring 38 in the FIG. 1 embodiment. The second spring 40 is not present, and the actuator 12 may be provided with but only a single spring 38. The upper terminal end of the arm 32 has a striker plate 34 located thereon. The striker plate 34 may be attached to the arm 32 through a bolted connection, or could be integrally formed with the arm 32. Pivoting of the arm 32 causes the striker plate 34 to engage the push button 28. Continued force applied by the actuation line 36 causes the striker plate 34 to actuate the push button 28 to release the line 30. The actuator 12 is shown in an "at rest" position in FIG. 6. The striker plate 34 may be arranged so as to push on the push button 28 to depress/pivot the push button 28 but not be moved under or past the push button 28. Once the string 22 is released, the force applied by actuation line 36 is removed and the spring 38 causes the arm 32 to pivot back to the at rest position. Since the striker plate 34 never moved past or under the push button 28, there is no interference with the return of the arm 32 and there is no need to have the second portion 46 to handle any interference.

Additionally or alternatively, the push button 28 could be of such a design that it can pivot or move upwards in the height direction 76 after actuation or backwards in the longitudinal direction 74 after actuation. Hence, even if the striker plate 34 moves past or under the push button 28, it can likewise move against and past the push button 28 upon pivoting backwards because the push button 28 can be moved/pivoted in opposite directions.

The base 42 is attached to the reel seat 54 on one end and to the mounting arm 68 on an opposite end in the longitudinal direction 74. This arrangement can be varied as previously discussed. Further, a base 42 is not needed in other exemplary embodiments of the mechanism 10. In this regard, the actuator 12 arm 32 can be attached to the reel seat 54 through the pivot engagement 48. The springs 38, 40 may be directly attached to the reel seat 54 or to some other portion of the bow 14 such as the mounting arm 68. Likewise, although shown and described as being indirectly attached to the riser 16 by way of the mounting arm 68, the actuator 12 may be directly attached to the riser 16 in other exemplary embodiments. For example, the arm 32 may be directly attached to the riser 16 through the pivoting engagement 48 that directly contacts the riser 16.

Figure 6:
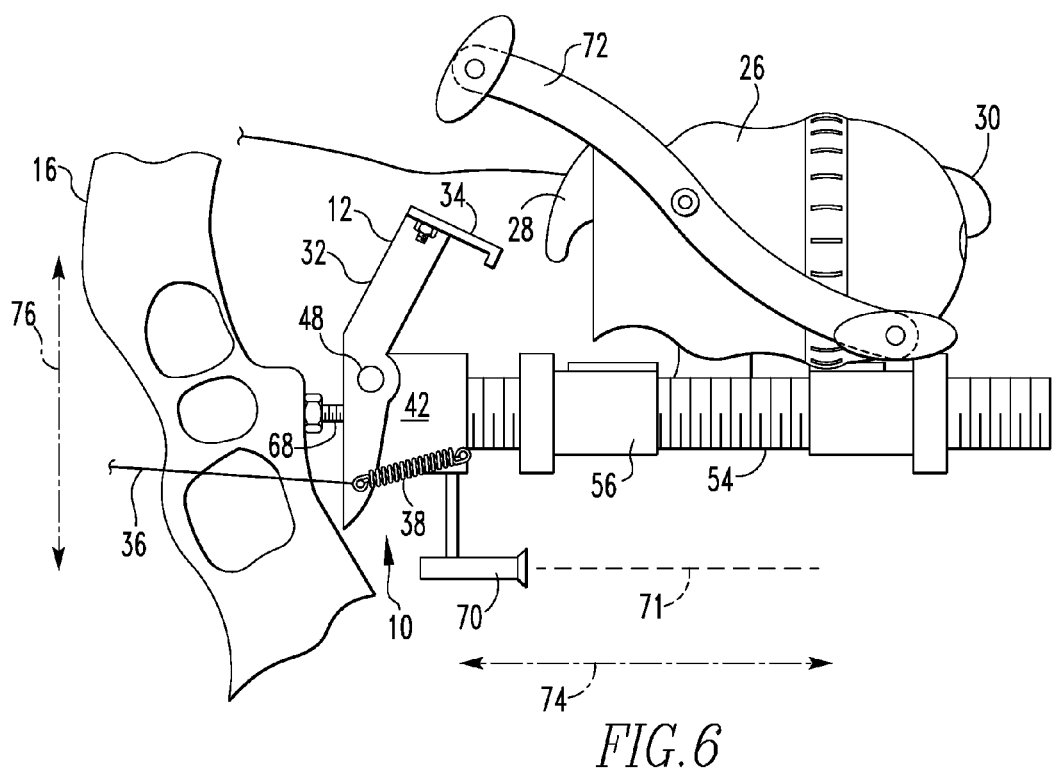
FIG. 6 is a detailed side view of an alternative exemplary embodiment of an automatic line release mechanism attached to a bow.

The mechanism 10 in the exemplary embodiment of FIG. 6 further includes a laser 70. The laser 70 may be mounted onto the base 42. In other arrangements, the laser 70 of the mechanism 70 could be mounted to other portions of the bow 14 such as the riser 16 and need not be directly attached to the base 42 or other portion of the actuator 12. The laser 70 can emit a laser beam 71 that is directed towards the target to which the archer is aiming. The laser beam 71 may extend forward in the longitudinal direction 74 from the actuator 12. The laser 70 may be mounted in the height direction 76 below the actuator 12.

Although described as being used in fishing, the automatic line release mechanism 10 can be used with bows 14 that are not used to hunt fish in other exemplary embodiments. For example, the mechanism 10 can be used with bows 40 to hunt land animals or for target practice. The release mechanism 10 may eliminate the need for the archer to remember to press the push button 28 thus preventing the inadvertent destruction of components of the reel 26 if the push button 28 were by mistake not actuated. Further, as the archer need not first press the push button 28 and then subsequently draw the string 22, time in firing the bow 14 may be saved thus allowing the archer to fire the bow faster to increase their chances of hitting the target, or to spend more time in aiming the bow 14 as the button 28 is automatically actuated. Further, automatic release of the line 30 occurs when the bow 14 is drawn, thus eliminating time between pressing the button 28 manually and then drawing the bow 14. Movement of the bow 14 in this time period may cause the now released line 30 to fall off of the reel 26 and become entangled onto something or otherwise hinder proper firing of the arrow 58. Elimination of this time period thus reduces the chances of injury of the archer and interference with the flight of the arrow.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An automatic line release mechanism for a bow, comprising:
an actuator that moves relative to a riser of the bow when a string of the bow is drawn, wherein when the string of the bow is drawn the actuator actuates a push button of a reel to cause line of the reel to be released, wherein the actuator has an arm and a spring that urges the arm to move in a direction opposite to the direction of movement that the arm moves when the string of the bow is drawn, wherein the actuator has a pivot engagement and rotates to actuate the push button such that a point of contact of the actuator that contacts the push button rotates into and out of contact with the push button.

2. The automatic line release mechanism as set forth in claim 1, wherein the arm pivots relative to the riser of the bow when the string of the bow is drawn to effect the movement of the actuator relative to the riser.

3. The automatic line release mechanism as set forth in claim 2, wherein the actuator has a striker plate located at a terminal end of the arm, wherein the striker plate engages the push button and actuates the push button to cause the line of the reel to be released when the string of the bow is drawn, wherein the point of contact of the actuator is on the striker plate.

4. The automatic line release mechanism as set forth in claim 1, wherein the bow has a reel seat, wherein the reel is mounted to the reel seat at a mounting location, wherein the reel is a closed face reel, and wherein the actuator has a base that is located between the riser and the mounting location, wherein the base does not move relative to the riser, wherein the pivot engagement is at the base.

5. The automatic line release mechanism as set forth in claim 1, further comprising a laser that is used for aiming an arrow that is fired by the bow.

6. The automatic line release mechanism for a bow, comprising:
an actuator that moves relative to a riser of the bow when a string of the bow is drawn, wherein when the string of the bow is drawn the actuator actuates a push button of a reel to cause line of the reel to be released;
wherein the actuator has an arm that pivots relative to the riser of the bow when the string of the bow is drawn to effect the movement of the actuator relative to the riser;
wherein the actuator has a striker plate located at a terminal end of the arm, wherein the striker plate engages the push button and actuates the push button to cause the line of the reel to be released when the string of the bow is drawn, wherein the actuator has a pivot engagement and rotates to actuate the push button such that a point of contact of the actuator that is on the striker plate that contacts the push button rotates into and out of contact with the push button;
wherein the actuator has an actuator line that is attached to a cable of the bow and to the arm of the actuator, wherein when the string of the bow is drawn the cable moves to cause the actuator line to move to cause the arm to pivot, wherein the actuator has a spring that is attached to the arm, wherein the spring urges the arm to pivot in a direction that is opposite to the direction of pivoting of the arm that the actuator line imparts to the arm.

7. An automatic line release mechanism for a bow, comprising:
a reel seat mounted to a riser of the bow;
an actuator that moves relative to the riser of the bow when a string of the bow is drawn, wherein when the string of the bow is drawn the actuator actuates a push button of a reel to cause line of the reel to be released;
wherein the actuator has an arm that pivots relative to the riser of the bow when the string of the bow is drawn to effect the movement of the actuator relative to the riser;
wherein the arm has a first portion and a second portion, wherein the first portion has a first portion pivot engagement and rotates relative to the reel seat, wherein the second portion pivots relative to the first portion, wherein the second portion has a second portion pivot engagement that places the second portion into pivot engagement with the first portion, wherein when the string of the bow is drawn the second portion actuates the push button to cause the line of the reel to be released;
a first spring that is attached to the first portion at a location spaced from the first portion pivot engagement, wherein the first spring applies force to the first portion to cause the first portion to rotate about the first portion pivot engagement relative to the reel seat;
a second spring that is attached to the second portion at a location spaced from the second portion pivot engagement, wherein the second spring applies force to the second portion to cause the second portion to rotate about the second portion pivot engagement relative to the first portion;
wherein the first spring and the second spring are separate components and are spaced from one another and free from contact with one another.

8. The automatic line release mechanism as set forth in claim 7, wherein the actuator has an actuator line that is attached to the first portion, wherein when the string of the bow is drawn the actuator line moves to cause pivoting of the first portion relative to the riser, wherein the first spring urges the first portion to pivot relative to the riser in a direction opposite to the direction of pivoting of the first portion caused by the actuator line when the string of the bow is drawn.

9. The automatic line release mechanism as set forth in claim 7, wherein after the push button is actuated the second portion engages the push button and is pivoted relative to the first portion.

10. An automatic line release mechanism for a bow, comprising:
an actuator located on a mounting arm of a bow, wherein the actuator has an actuator line and an arm that is attached to the actuator line, wherein the arm pivots relative to the mounting arm, wherein when a string of the bow is drawn the actuator line moves to cause pivoting of the arm relative to the mounting member,
wherein the bow has a reel seat and a reel mounted to the reel seat, wherein the reel has a push button, wherein when the string of the bow is drawn the actuator line moves to cause the pivoting of the arm relative to the mounting member to cause the arm to engage the push button and actuate the push button to cause line of the reel to be released, wherein after engagement with the push button while the string of the bow is drawn a portion of the arm rotates under the push button in a height direction of the bow and is located between the push button and the reel seat in the height direction and is disengaged from the push button and free from contact with the push button, wherein when the string of the bow is released the portion of the arm rotates back into engagement with the push button to contact and move past the push button to assume an at rest position free from contact with the push button which is the same position the portion of the arm is in before the string of the bow is drawn, wherein the actuator has a first spring that is attached to the arm and urges the arm to pivot in an opposite direction to the direction of pivoting of the arm that the actuator line imparts onto the arm when the string of the bow is drawn.

11. The automatic line release mechanism as set forth in claim 10, wherein the first spring is attached to the reel seat.

12. The automatic line release mechanism as set forth in claim 10, wherein the actuator has a base that is located between a riser of the bow and the reel seat, wherein the arm is pivotally mounted to the base, wherein the first spring is attached to the base.

13. The automatic line release mechanism as set forth in claim 10, wherein the actuator has a clamp that is attached to a cable of the bow, wherein the actuator line is attached to the clamp such that the clamp attached the actuator line to the cable.

14. The automatic line release mechanism as set forth in claim 10, wherein the arm has a first portion and a second portion, wherein the second portion is in pivoting engagement with the first portion, wherein when the string of the bow is drawn the second portion engages the push button of the reel and actuates the push button to cause the line of the reel to be released,
wherein after actuation of the push button the second portion engages the push button and pivots relative to the first portion.

15. The automatic line release mechanism as set forth in claim 14, wherein the first spring is attached to the first portion,
wherein the actuator has a second spring that is attached to the second portion, wherein the second spring urges the second portion to pivot relative to the first portion, wherein the second portion is in pivoting engagement with the first portion through a pivot engagement, wherein the pivot engagement is located between a point of attachment of the second spring to the second portion and a point of engagement between the second portion and the push button when the push button is actuated.

16. The automatic line release mechanism as set forth in claim 10, wherein the actuator has a striker plate located at a terminal end of the arm, wherein the striker plate engages the push button and actuates the push button to cause the line of the reel to be released when the string of the bow is drawn, wherein the first spring is attached to the reel seat.

17. The automatic line release mechanism as set forth in claim 10, wherein the actuator line is attached to the string.

18. An automatic line release mechanism for a bow, comprising:
a reel seat mounted to a riser of the bow;
an actuator that has an arm with a first portion and a second portion, wherein the first portion has a first portion pivot engagement and rotates relative to the reel seat, wherein the second portion is mounted to the first portion through a pivot engagement, wherein the second portion has a second portion pivot engagement that places the second portion into pivot engagement with the first portion,
wherein the first portion pivots relative to a riser of the bow, wherein the actuator has an actuator line that moves when a string of the bow is drawn, wherein when the string of the bow is drawn the actuator line moves to cause pivoting of the first portion relative to the riser from an at rest position to cause the second portion to actuate a push button of a closed face reel of the bow to release line of the closed face reel,
wherein after the string of the bow is released and an arrow is fired by the bow the second portion engages the push button and is pivoted relative to the first portion to allow the first portion to pivot back to the at rest position;
a first spring that is attached to the first portion at a location spaced from the first portion pivot engagement, wherein the first spring applies force to the first portion to cause the first portion to rotate about the first portion pivot engagement relative to the reel seat;
a second spring that is attached to the second portion at a location spaced from the second portion pivot engagement, wherein the second spring applies force to the second portion to cause the second portion to rotate about the second portion pivot engagement relative to the first portion;
wherein the first spring and the second spring are separate components and are spaced from one another and free from contact with one another.

19. The automatic line release mechanism as set forth in claim 18, wherein the actuator line is attached to a cable slide of the bow, wherein the cable slide moves in a longitudinal direction relative to a riser of the bow.

* * * * *